United States Patent [19]

Chudakov

[11] Patent Number: 5,255,706
[45] Date of Patent: Oct. 26, 1993

[54] HIGH-PRESSURE BALL VALVE WITH INTERNAL PRESSURE EQUALIZATION

[75] Inventor: Stanlislav Chudakov, Bethlehem, Pa.

[73] Assignee: Hycon Corporation, Bethlehem, Pa.

[21] Appl. No.: 979,503

[22] Filed: Nov. 20, 1992

[51] Int. Cl.⁵ .............................................. F16K 5/06
[52] U.S. Cl. ............................... 137/637.3; 137/599.2
[58] Field of Search ............... 137/637.3, 637.5, 599.2

[56] References Cited

U.S. PATENT DOCUMENTS

| | | | |
|---|---|---|---|
| 3,333,813 | 8/1967 | Rabe | 251/172 |
| 3,617,025 | 11/1972 | Gerbic | 251/172 |
| 3,647,178 | 3/1972 | Adams | 251/148 |
| 3,993,136 | 11/1976 | Mott | 166/314 |
| 4,103,744 | 8/1978 | Akkerman | 166/324 |
| 4,187,872 | 2/1980 | Freeman | 137/599.2 X |
| 4,566,672 | 1/1986 | Giebeler | 251/192 |
| 4,580,603 | 4/1986 | Schoen | 137/630 |
| 4,624,281 | 11/1986 | Vidal | 137/599.2 |
| 5,052,657 | 10/1991 | Winship | 251/160 |

FOREIGN PATENT DOCUMENTS 188383 3/1937 Switzerland ..................... 137/599.2

Primary Examiner—Robert G. Nilson
Attorney, Agent, or Firm—Seidel, Gonda, Lavorgna & Monaco

[57] ABSTRACT

A fluid control valve includes a valve body having an inlet and an outlet and a control member in the valve body externally operable by a movable operating member. The control member is pivotable between open and closed positions for selectably controlling fluid flow between the inlet and the outlet. The control member has a passage therethrough for selectably permitting fluid to flow from the inlet to the outlet when the control member is in the open position. A conduit is provided through the control member and has a first end and a second end, the first end being in fluid communication with the inlet and the second end being in fluid communication with the outlet when the control member is in the closed position. A secondary valve is provided at the conduit first end and is operable between open and closed positions for selectably opening and closing the first end of the conduit independent of movement of the operating member.

9 Claims, 2 Drawing Sheets

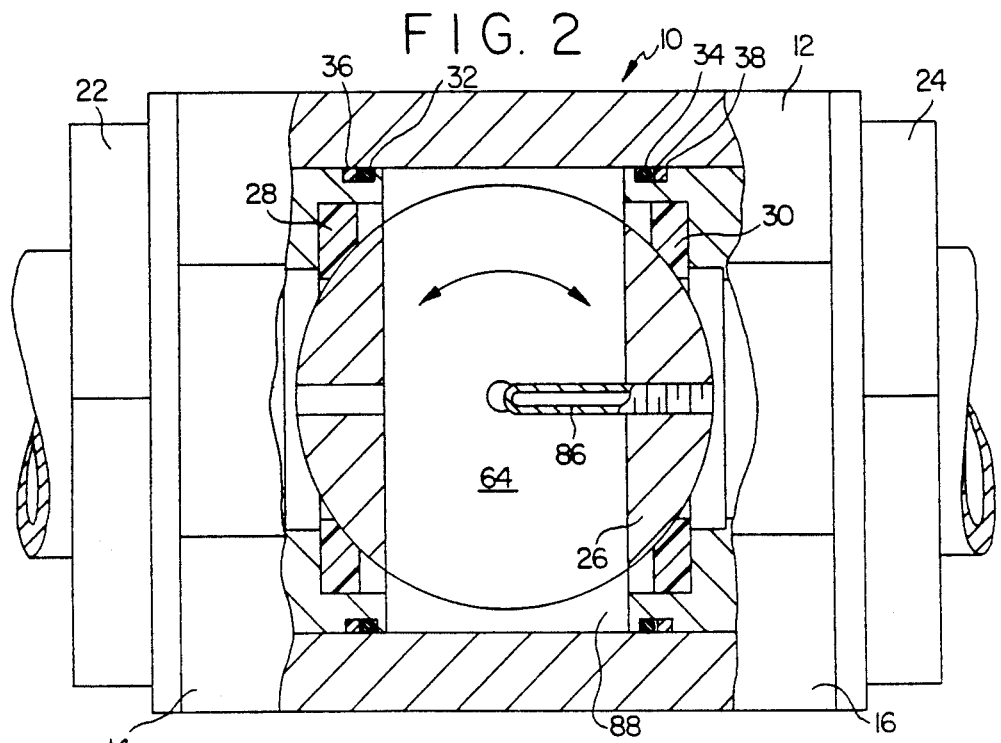
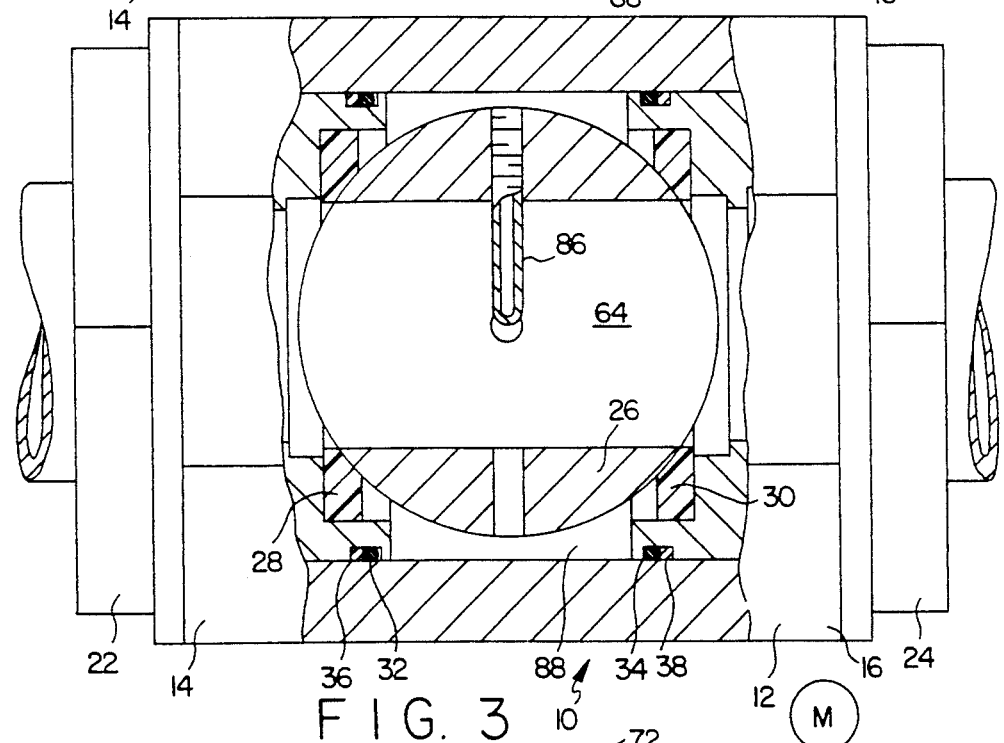
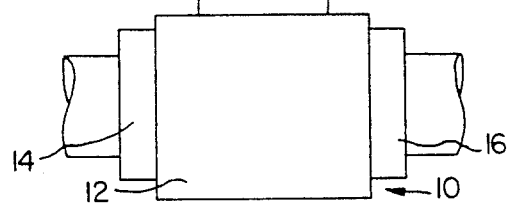

HIGH-PRESSURE BALL VALVE WITH INTERNAL PRESSURE EQUALIZATION

FIELD OF THE INVENTION

The present invention relates to high-pressure valves, particularly ball valves, which are used to control the flow of high-pressure fluids and which contain means for equalizing the pressure across the inlet (upstream) and outlet (downstream) sides of the valves.

BACKGROUND OF THE INVENTION

Ball valves are employed in a variety of applications in hydraulic systems. For example, ball valves are used as shut-off valves to separate branches of hydraulic systems, as safety valves during maintenance of hydraulic systems, and as devices for controlling flow direction.

The general trend in the fluid power industry is toward higher system pressures. This has, in turn, exacerbated the problems in operating ball valves. It has long been recognized that it is extremely difficult, and in some cases almost impossible, to operate a ball valve under pressure, especially to open one. Clearly, this situation is intolerable, especially in an emergency situation.

Ball valves belong to the group of so-called "non-restrictive flow" valves. The closing element of the valve—the ball—generally floats (i.e., is not rigidly mounted) with respect to the valve body, and rotates within annular valve seats on either side of the ball. Typically, the valve seats are plastic. The ball is exposed to fluid pressure over the area of the full (non-restricted) valve passage. Because the ball presents a substantial area to the pressurized fluid, the fluid forces the ball against the valve seat with great force. Since force is the product of pressure multiplied by area, the higher the pressure, and the higher the area, the greater the force. If the valve is left in the closed position for a sufficient period of time (i.e., three hours or longer), the friction between the valve seat and the ball becomes enormous. This is due primarily to two factors. First, the normally-present lubricating film on the contact surfaces of the ball and valve seats is squeezed out, and hence dry friction is substituted for wet friction. It should be apparent that dry friction will be much greater than wet friction. Second, the plastic material of the seat deforms under pressure, and will be forced into and fill the microscopic voids inevitably present on the surface of the ball. As a result of these two phenomena, the resistance to opening can be so high that the ball is virtually impossible to rotate by hand or even with a wrench.

Prior attempts to solve this problem have focused on reducing the diameter of the flow passage through the ball, reducing the system pressure, or using a parallel pressure equalization line between upstream and downstream sides of the valve. These techniques are clearly unsatisfactory. The first two compromise the main advantages of ball valves: unrestricted flow and the ability to withstand high pressures. The third method requires the installation of additional piping, fittings and valves outside of the valve body, which makes that method very expensive and not always feasible, such as in installations where space is limited.

There is therefore a need to provide a ball valve which permits unrestricted flow and which operates at high pressures, and which overcomes the difficulties associated with prior art ball valves. The present invention fills that need.

SUMMARY OF THE INVENTION

The present invention encompasses a fluid control valve comprising a valve body having an inlet and an outlet and a control member in the valve body externally operable by a movable operating member. The control member is pivotable between open and closed positions for selectably controlling fluid flow between the inlet and the outlet. The control member has a passage therethrough for selectably permitting fluid to flow from the inlet to the outlet when the control member is in the open position. Conduit means are provided through the control member and have a first end and a second end, the first end being in fluid communication with the inlet and the second end being in fluid communication with the outlet when the control member is in the closed position. A secondary valve means is provided at the conduit first end and is operable between open and closed positions for selectably opening and closing the first end of the conduit means independent of movement of the operating member.

DESCRIPTION OF THE DRAWINGS

For the purpose of illustrating the invention, there is shown in the drawings a form which is presently preferred; it being understood, however, that this invention is not limited to the precise arrangements and instrumentalities shown.

FIGS. 2 and 3 are partial sectional views taken along the lines 2—2 in FIG. 1, showing the valve in the closed and open positions, respectively.

FIG. 5 is a schematic view of a valve according to the present invention, illustrating a motor for operating the valve.

DESCRIPTION OF THE INVENTION

Figure 1:
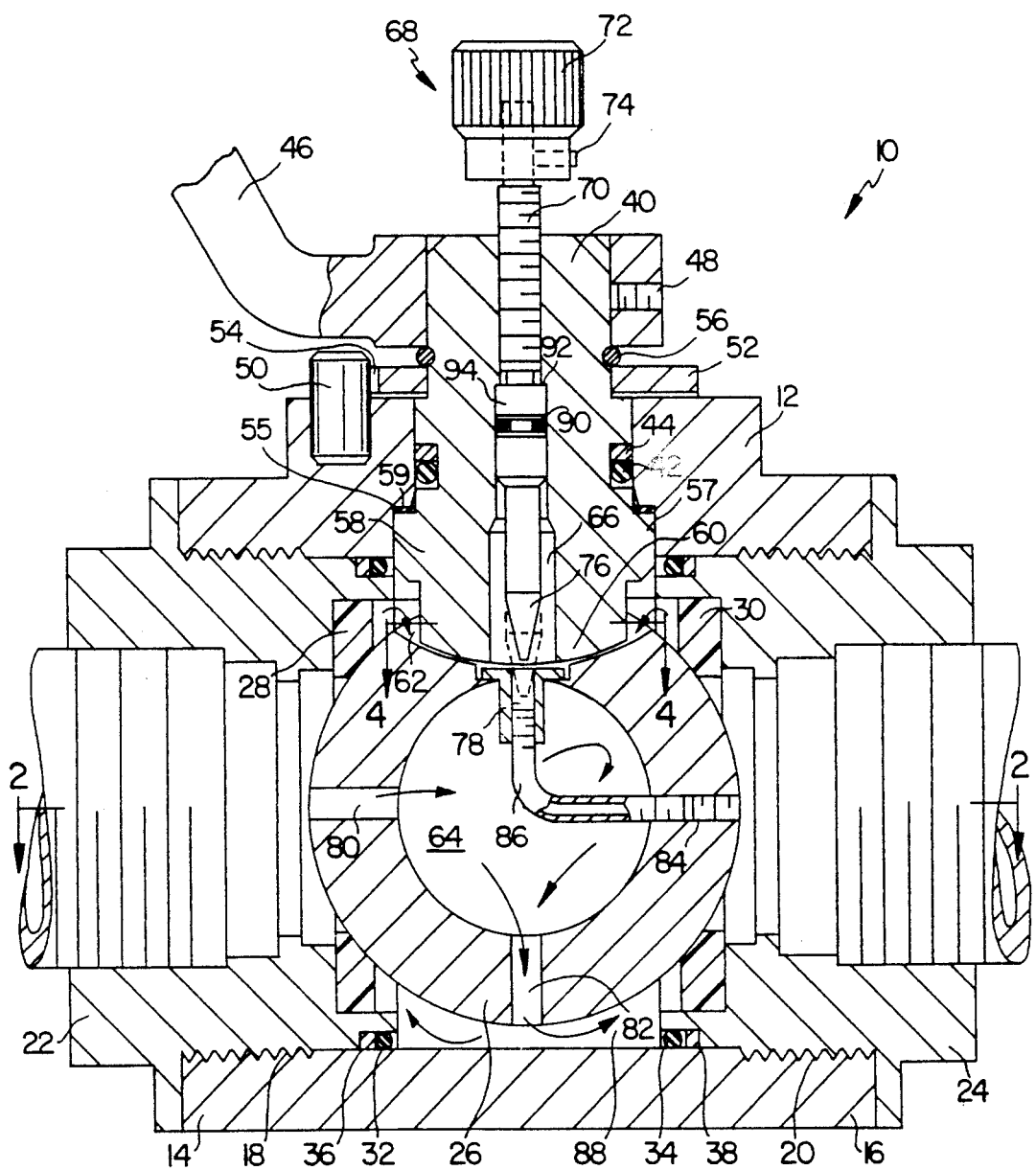
FIG. 1 is a longitudinal sectional view of a valve according to the present invention.

Referring now to the drawings, wherein like numerals indicate like elements, there is shown in the figures a ball valve 10 in accordance with the present invention. Valve 10 comprises a housing 12, which has an inlet side 14 and an outlet side 16. Inlet side 14 and outlet side 16 have threaded bores 18 and 20, respectively, into which are threaded inlet connection adapter 22 and output connection adapter 24, respectively. Inlet connection adapter 22 and output connection adapter 24 enable valve 10 to be conn.cted to piping in known fashion.

Valve 10 includes a control member in the form of a ball 26 for controlling the flow of fluids between inlet side 14 and outlet side 16. Ball 26 is free to rotate within the central portion of housing 12 between inlet side 14 and outlet side 16, and is located for rotation between cup seals 28 and 30. Cup seals 28 and 30 are seated in counterbores in inlet connection adapter 22 and outlet connection adapter 24, in known manner. Inlet connection adapter 22 and outlet connection adapter are also sealed with respect to housing 12 by O-rings 32, 34, respectively, and back-up rings 36, 38, respectively, also in known manner.

Ball 26 is referred to in the art as a "floating" ball, and turns freely between cup seals 28 and 30. A positive seal is attained by fluid pressure acting on the inlet, or "upstream," side of ball 26, which produces a constant uniform contact between the outlet, or "downstream," side of ball 26 and cup seal 30.

Ball 26 is operated by a rotatable control spindle 40, which is journaled for rotation in valve housing 12. Control spindle 40 is sealed against valve housing 12 by an O-ring 42 and a back-up thrust washer 44, also in known manner. Control spindle 40 is rotated by a control handle 46 through a square end, again in known manner. Control handle 46 is secured to control spindle 40 by a set screw 48, also in known manner. Control handle 48 can also be secured to control spindle 40 by any suitable means, such as by a split collar or a slot and key arrangement, as desired. In addition, if desired, the rotation of control handle 46, and consequently the rotation of control spindle 40, can be limited by a stop pin 50 and limit washer 52. Limit washer 52 may be provided with one or more slots 54 which engage stop pin 50 as control handle 46 is rotated. Spring wire retainer 56 holds limit washer 52 in place.

A TEFLON ® thrust washer 55 is provided between annular projection 57 on spindle 40 and shoulder 59 in valve housing 12. Thrust washer 55 prevents metal-to-metal contact which would occur between projection 57 and shoulder 59 due to internal pressure in valve 10, and reduces friction between spindle 40 and housing 12, which makes spindle 40 easier to turn.

Control handle 46 is illustrated as being manually operable. However, it should be understood that the invention is not limited to a manually-operable control handle, but comprises motor-driven devices as well. That is, control spindle 40 may be coupled directly or indirectly to the shaft of a drive motor M such as an electric or fluid motor, or may be operated directly or indirectly from a fluid cylinder, such as a hydraulic or pneumatic cylinder.

Figure 4:
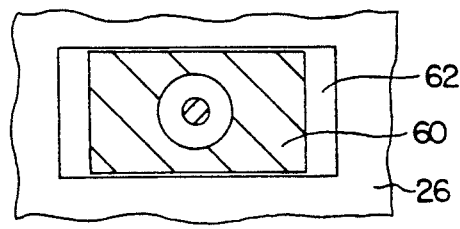
FIG. 4 is a partial sectional view taken along the lines 4—4 in FIG. 1.

The interior end 58 of control spindle 40 is provided with a rectangular projection 60 which engages a receiving slot 62 in ball 26. As best seen in FIG. 4, slot 62 is preferably of dimensions slightly larger than the dimensions of projection 60, so that rotation of control spindle 40 causes rotation of ball 26 without substantial lost motion while at the same time leaving sufficient space between projection 60 and ball 26 to permit fluid to flow through the space, for reasons to be explained in detail below.

As with conventional ball valves, ball 26 is provided with a central through bore 64 through which fluid can flow when the valve is open. Thus, to open valve 10, ball 26 is rotated by control spindle 40, by rotating control handle 46, so that bore 64 is in alignment with inlet side 14 and outlet side 16, as best seen in FIG. 3. To close valve 10, ball 26 is rotated so that bore 64 is oriented at right angles to inlet side 14 and outlet side 16, as best seen in FIGS. 1 and 2.

When valve 10 is in the closed position, the pressure of the fluid at the inlet side 14 acts on the upstream side of ball 26 to force it against downstream cup seal 30. When valve 10 is used in high pressure systems, the force applied by the fluid can make it extremely difficult, if not actually impossible, to thereafter open valve 10. Thus, some way of equalizing the pressures, and thus the forces, on the upstream and downstream sides of ball 26 is needed.

In the present invention, pressure equalization is attained by a secondary valve and a conduit which permit a portion of the upstream fluid to pass through ball 26 while ball 26 is still in the closed position in order to balance the forces on ball 26 and make it easier to turn. This system will now be described.

Control spindle 40 is provided with a central bore 66 in which is located a needle valve 68. Needle valve 68 includes a valve stem 70 and a knurled knob 72, which enables valve stem 70 to be selectably rotated by hand. Rotation of knob 72 causes axial motion of valve stem toward and away from ball 26 as knob is rotated clockwise and counterclockwise, respectively. Knob 72 may be attached to valve stem 70 by a set screw 74, for example, in known manner. Tip 76 of valve stem 70 cooperates with a valve seat in the form of bushing 78 set into ball 26 in slot 62. Thus, as knob 72 is turned, tip 76 is caused to enter or to be retracted from bushing 78. As seen in FIG. 1, one end of bushing 78 is in communication with slot 62 in ball 26, while the other end of bushing 78 extends into bore 64 in ball 26.

An elastomeric O-ring 90 is provided to seal valve stem 70 to prevent leakage from valve 10 around the valve stem.

As a safety feature, spindle 40 is provided with an internal shoulder 92 in bore 66. Valve stem 70 is provided with an annular projection 94 which abuts shoulder 92. Thus, valve stem 70 is prevented from moving out of spindle 40 under pressure from inside valve 10. If shoulder 92 and projection 94 were not present, it would be possible for an individual to unscrew valve stem 70 when opening it, which could result in valve stem 70 being ejected from valve 10 with great force, leading to the risk of serious injury or damage to adjacent equipment.

Ball 26 is further provided with a plurality of bores or passages 80, 82 and 84 from the exterior surface of ball 26 through to bore 64. Passages 80 and 82 communicate directly with bore 64. Passage 84, however, communicates through the bore 64 to bushing 78 via a conduit 86 which runs through the bore 64 from passage 84 to bushing 78. Thus, passage 84 is in communication with slot 62 in ball 26. When ball 26 is in the closed position, as shown in FIG. 1, passage 80 is in alignment with inlet side 14 of valve 10, and passage 84 is in alignment with outlet side 16. When ball 26 is in the open position, passages 80 and 84 are aligned at right angles to the inlet side 14 and outlet side 16 of valve 10. Passage 82 is in communication with an annular space 88 in housing 12 and which surrounds ball 26, independent of the position of ball 26.

Operation of valve 10 will now be described.

To close valve 10, control handle 46 is rotated to cause bore 64 in ball 26 to be at right angles to inlet side 14 and outlet side 16, in which ball 26 is in the closed position. Prior to rotating control handle 46, knob 72 of needle valve 69 is rotated clockwise to cause tip 76 to seat in bushing 78, thus closing needle valve 68. As control handle 46 is rotated, ball 26, valve stem 70 and bushing 78 of needle valve 68 all rotate together. When ball 26 is rotated to the closed position, it stops the flow of fluid from inlet side 14 to outlet side 16. However, because passage 80 is in alignment with inlet side 14 when ball 26 is in the closed position, a small amount of fluid flows from inlet side 14 through passage 80 into bore 64, and from there through passage 82 into the space 88 between valve housing 12 and ball 26. This space 88 extends around the entire circumference of ball 26, and communicates with slot 62, previously described, in ball 26. Consequently, when ball 26 is in the closed position, slot 62 and bushing 78 are in fluid communication with inlet side 14 of valve 10. However, no fluid may flow to outlet side 16 when ball 26 and needle valve 68 are in their respective closed positions because of cup seal 30 and because of tip 76, seated in bushing 78, which seal outlet side 16 from space 88.

Before rotating control handle to rotate ball 26 to open valve 10, it is necessary to equalize the upstream and downstream pressures across ball 26. This is done simply by opening needle valve 68. Before operating control handle 46, knob 72 is rotated counterclockwise, causing tip 76 to retract from bushing 78, thus opening needle valve 68. When needle valve 68 is opened, the fluid in annular space 88 is free to flow through bushing 78 and conduit 86 to outlet side 16 while ball 26 is still in the closed position. Thus, a small amount of fluid is able to flow from inlet side 14 through passage 80, bore 64, passage 82, bushing 78, and conduit 86 to outlet side 16. This small amount of fluid flow is sufficient to equalize the pressure across ball 26. The equalization of pressure across ball 26 reduces the force with which ball 26 is pressed against cup seal 30, and enables ball 26 to turn more easily when control handle 46 is operated to open valve 10.

When valve 10 is open, as shown in FIG. 3, substantially all fluid flows from inlet side 14 to outlet side 16 through bore 64 without significant obstruction from conduit 86.

The present invention may be embodied in other specific forms without departing from the spirit or essential attributes thereof and, accordingly, reference should be made to the appended claims, rather than to the foregoing specification, as indicating the scope of the invention.

I claim:

1. A fluid control valve comprising a valve body having an inlet and an outlet, a floating control member in the valve body externally operable by a separate movable operating member, the control member being pivotable between open and closed positions for selectably controlling fluid flow between the inlet and the outlet, the control member having a passage therethrough for selectably permitting substantially unrestricted fluid flow from the inlet to the outlet when the control member is in the open position, conduit means through the control member and having a first end and a second end, the first end being in fluid communication with the inlet through an annular space around said control member, said annular space being in fluid communication with said inlet end when said control member is in the closed position and the second end being in fluid communication with the outlet when the control member is in the closed position, and secondary valve means at the conduit first end and in sealing engagement between said conduit first end and said annular space, said secondary valve means being operable between open and closed positions for selectably opening and closing the first end of the conduit means independent of movement of the operating member.

2. A valve as in claim 1, wherein the control member comprises a ball, and wherein at least a portion of said conduit means extends through said passage, said passage and conduit means permitting substantially unrestricted fluid flow.

3. A valve as in claim 1, wherein the secondary valve means comprises a needle valve having a valve stem contained substantially within the operating member and a valve seat cooperating with the valve stem, the valve seat comprising said conduit first end.

4. A valve as in claim 1, wherein the inlet and the outlet are substantially in axial alignment.

5. A valve as in claim 1, wherein the operating member is manually operable.

6. A valve as in claim 1, wherein the operating member is a motor.

7. A fluid control valve comprising
(a) a valve body having an inlet and an outlet,
(b) a rotatable ball mounted in the valve body between the inlet and the outlet for rotation between open and closed positions for controlling the flow of a fluid through the valve, the ball having a bore for permitting the passage of fluid therethrough when the ball is in the open position, the bore having a bore axis,
(c) movable operating means external to the valve body for rotating the ball,
(d) valve seat means in said body and in sealing engagement with the ball, the valve seat means defining an annular space around said ball, the annular space having an axis substantially coaxial with the bore axis, the annular space being in fluid communication with the inlet when the ball is in the closed position,
(e) conduit means through the ball having a first end in fluid communication with the annular space and a second end in fluid communication with the outlet when the ball is in the closed position, and
(f) secondary valve means for selectably opening and closing the first end of the conduit means for selectably causing the annular space to be in fluid communication with the outlet through the conduit independent of movement of the operating means.

8. A valve as in claim 7, wherein the secondary valve means is a needle valve.

9. A fluid control valve comprising
(a) a valve body having an inlet and an outlet substantially in axial alignment,
(b) a rotatable ball mounted in the valve body between the inlet and the outlet for rotation between open and closed positions for controlling the flow of a fluid through the valve, the ball having a main bore for permitting the passage of fluid therethrough when the ball is in the open position, the main bore having a bore axis which is substantially in axial alignment with the inlet and the outlet when the ball is in the open position, the ball further having at least one secondary bore therein extending between an outer surface of the ball and the main bore,
(c) movable operating means external to the valve body for rotating the ball,
(d) valve seat means in said body and in sealing engagement with the ball, the valve seat means defining an annular space around said ball, the annular space having an axis substantially coaxial with the bore axis, the annular space being in fluid communication with the inlet through the at least one secondary bore when the ball is in the closed position,
(e) conduit means through the ball having a first end in fluid communication with the annular space and a second end in fluid communication with the outlet when the ball is in the closed position, and
(f) needle valve means having a valve stem which cooperates with the first end of the conduit means for selectably opening and closing the first end of the conduit means for selectably causing the annular space to be in fluid communication with the outlet through the conduit independent of movement of the operating means.

* * * * *

UNITED STATES PATENT AND TRADEMARK OFFICE
CERTIFICATE OF CORRECTION

PATENT NO. : 5,255,706

DATED : October 26, 1993

INVENTOR(S) : Stanislav Chudakov

It is certified that error appears in the above-indentified patent and that said Letters Patent is hereby corrected as shown below:

On the title page, item (75): Inventors, should read --
Stanislav Chudakov, Bethlehem, Pa.--

Signed and Sealed this

Fifth Day of April, 1994

Attest:

BRUCE LEHMAN

Attesting Officer     Commissioner of Patents and Trademarks